(12) United States Patent
Bailey, Jr. et al.

(10) Patent No.: US 8,959,107 B2
(45) Date of Patent: Feb. 17, 2015

(54) ENUMERATING WMI OBJECT PROPERTIES THROUGH T-SQL

(75) Inventors: George E. Bailey, Jr., Houston, TX (US); Kurt V. Goolsbee, Spring, TX (US); Everett T. Miskelly, Houston, TX (US)

(73) Assignee: BBS Technologies, Inc., Houston, TX (US)

( * ) Notice: Subject to any disclaimer, the term of this patent is extended or adjusted under 35 U.S.C. 154(b) by 755 days.

(21) Appl. No.: 13/225,243

(22) Filed: Sep. 2, 2011

(65) Prior Publication Data

US 2013/0060731 A1    Mar. 7, 2013

(51) Int. Cl.
*G06F 7/00* (2006.01)
*G06F 17/30* (2006.01)
*G06F 9/44* (2006.01)
*G06F 15/173* (2006.01)
*G06F 11/34* (2006.01)

(52) U.S. Cl.
CPC ........ *G06F 11/3466* (2013.01); *G06F 11/3409* (2013.01); *G06F 2201/80* (2013.01)
USPC ........... 707/769; 717/106; 717/114; 717/115; 717/127; 709/223; 709/224

(58) Field of Classification Search
None
See application file for complete search history.

(56) References Cited

U.S. PATENT DOCUMENTS

| | | | |
|---|---|---|---|
| 7,107,597 B2 * | 9/2006 | Shappir et al. | 719/328 |
| 7,165,104 B2 * | 1/2007 | Wang | 709/224 |
| 2009/0063509 A1 * | 3/2009 | Lockhart et al. | 707/10 |

* cited by examiner

*Primary Examiner* — Ajay Bhatia
*Assistant Examiner* — Cheryl M Shechtman
(74) *Attorney, Agent, or Firm* — Park, Vaughan, Fleming & Dowler LLP; Laxman Sahasrabuddhe

(57) ABSTRACT

Methods and systems for collecting database performance data. During operation a database server can receive a set of T-SQL statements, wherein the database server executes on a computer system and provides access to a database. Next, the database server can execute the set of T-SQL statements, thereby causing the database server to: (1) create an external script which, when executed by the computer system, collects performance data in a file; (2) execute the external script on the computer system; (3) wait for the external script to complete execution; and (4) load the performance data from the file into a table in the database.

14 Claims, 3 Drawing Sheets

ENUMERATING WMI OBJECT PROPERTIES THROUGH T-SQL

TECHNICAL FIELD

This disclosure relates to database systems. More specifically, this disclosure relates to enumerating WMI (Windows Management Instrumentation) object properties through T-SQL (Transact-SQL).

BACKGROUND

Related Art

Database systems are used for many mission critical applications in modern enterprises. The size and complexity of databases has grown exponentially over the past several years. It is not uncommon for an enterprise to use terabyte- or petabyte-sized databases.

Given the size and complexity of modern databases, and the fact that they are commonly used in mission critical applications, it is not surprising that database performance is often an important issue.

Some approaches for improving performance involve analyzing performance data of the database system. However, before such data can be analyzed, it needs to be collected. Unfortunately, some types of performance data are not readily available for collection and analysis.

SUMMARY

Some embodiments described herein provide methods and systems for collecting performance data for a database system. During operation, a database server can receive a set of T-SQL statements, wherein the database server executes on a computer system and provides access to a database. Next, the database server can execute the set of T-SQL statements, thereby causing the database server to: (1) create an external script which, when executed by the computer system, collects performance data in a file; (2) execute the external script on the computer system; (3) wait for the external script to complete execution; and (4) load the performance data from the file into a table.

In some embodiments, the external script, when executed by the computer system, enumerates WMI object properties and writes the WMI object properties into the file. In some embodiments, the external script is executed in a process that is separate from the database server. In some embodiments, each row of the table contains performance data for one WMI object property.

Subsequently, the database server can receive a database query to retrieve performance data for a WMI object property. In response, the database server can perform the database query on the table to provide the performance data for the WMI object property.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
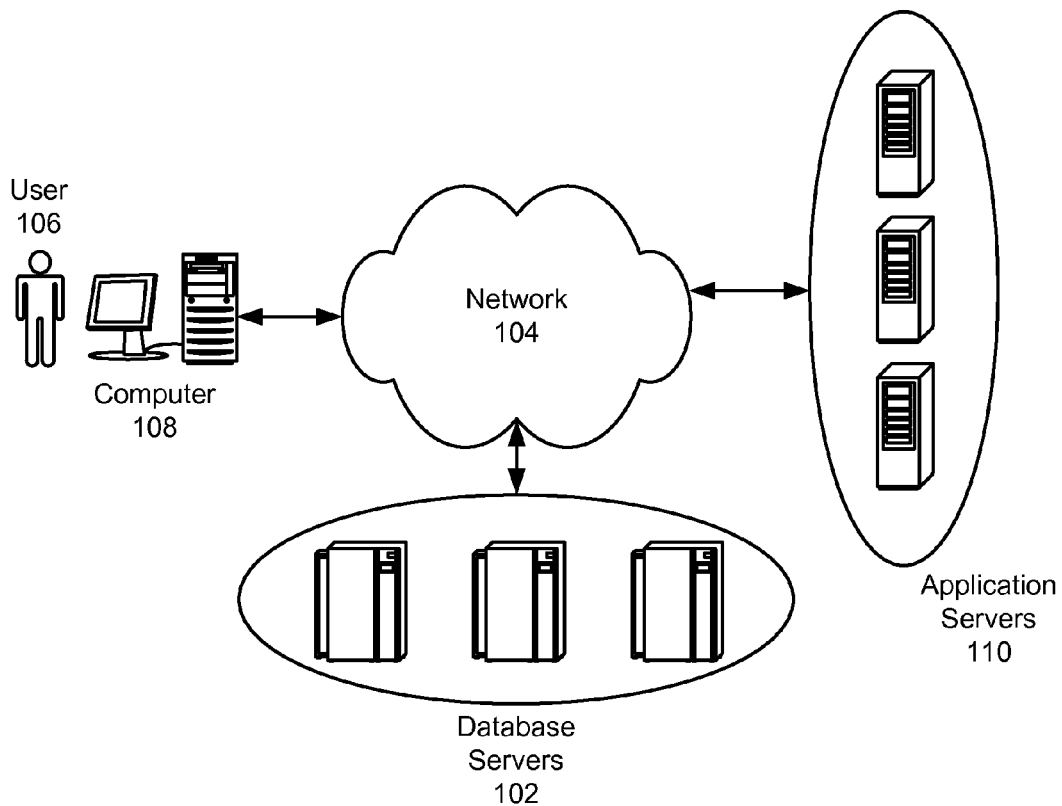
FIG. 1 illustrates a system in accordance with some embodiments described herein.

FIG. 1 illustrates a system in accordance with some embodiments described herein. The system shown in FIG. 1 includes a set of application servers 110, a set of database servers 102, user 106 at computer 108, and network 104. Computer 108, application servers 110, and database servers 102 can communicate with one another via network 104.

Network 104 can generally include any type of wired or wireless communication channel capable of coupling together computing nodes. This includes, but is not limited to, a local area network, a wide area network, or a combination of networks. In some configurations application servers 110 and database servers 102 can be located on the same physical device.

Database servers 102 can store data using a variety of data storage systems. This includes, but is not limited to, systems based upon magnetic, optical, and magneto-optical storage devices, as well as storage devices based on flash memory and/or battery-backed up memory.

User 106 can be a database administrator (DBA) who is responsible for the operation and maintenance of database servers 102, and typically has the privilege to modify data stored in the storage system.

According to one definition: (1) a database is an organized collection of data; (2) a database server is a computer program that executes on a computer system and provides access to one or more databases based on a client-server model; and (3) a database system comprises, among other things, one or more databases, one or more database servers, and one or more computer systems on which the one or more database servers execute.

Figure 2:
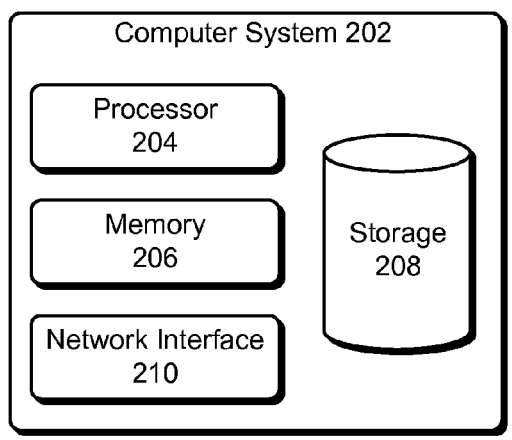
FIG. 2 illustrates a computer system in accordance with some embodiments described herein.

FIG. 2 illustrates a computer system in accordance with some embodiments described herein.

Computer system 202 can include processor 204, memory 206, storage 208 (e.g., flash or disk), and network interface 210. Computer system 202 can execute one or more instances of a database server. Specifically, storage 208 can include a database and instructions for a database server. The instructions for a database server can be loaded into memory 206 and executed by processor 204. During execution, the database server can receive requests to perform database operations from remote computers via network interface 210, and perform the requested database operations on the database stored in storage 208.

Computer system 202 can include hardware and/or software instrumentation to measure various hardware and/or database performance metrics. For example, computer system 202 may include hardware and/or software instrumentation to measure the amount of time (e.g., number of clock cycles) used on a processor, the amount of memory being used, the number of I/O requests that are performed on storage 208, the amount of data read and/or written to storage 208, and the number of packets and/or bytes received and/or sent via network interface 210. Specifically, in some embodiments, the operating system (OS) can keep track of the processor time (e.g., by using a hardware clock), memory usage (e.g., by using the OS memory management component), I/O requests (e.g., by using the OS disk access and/or file system components), and network traffic (e.g., by using the OS networking stack and/or counters in the networking interface). These examples of performance metrics (e.g., processor time, memory usage, I/O requests, etc.) and software entities (e.g., procedure, batch, database query) are for illustration purposes only, and are not intended to limit the scope of this disclosure to the forms disclosed.

WMI is the infrastructure for management data and operations on Windows-based operating systems. Specifically, WMI can be used to collect performance data (e.g., by reading various performance counters) associated with one or more performance metrics for a Windows-based computer system.

Once the performance data has been collected, it can be analyzed to determine recommendations to improve performance. The software application or module that performs the analysis can be co-located with the database server or reside on a different computer system. For example, the performance data that is collected on one or more database servers 102 shown in FIG. 1 can be sent to computer 108. An application executing on computer 108 can, with or without user intervention, analyze the performance data and provide recommendations to improve performance and/or solve database performance issues.

When a client device communicates with a database server, the client device typically establishes a communication channel with the database server. The client device can then send T-SQL statements and receive the corresponding results over the communication channel.

Setting up a communication channel between two computers (e.g., a client and a server) can be tedious and error-prone. Specifically, both computers may need to be configured so that they can successfully authenticate themselves. Furthermore, various networking devices (e.g., proxies, firewalls, switches, routers, etc.) may need to be appropriately configured so that the communication channel can be set up successfully. Additionally, port settings, security keys, tokens, and/or passwords may also need to be configured on the end-hosts and/or on the intermediate devices (e.g., proxies, firewalls, switches, routers, etc.) to enable communication.

Some embodiments described herein allow a remote computer to use a database connection to collect performance data. These embodiments do not require the system to set up an additional connection for collecting performance data since the database connection has already been set up for performing database operations. Note that the database connection is specifically created to perform database operations. It is non-obvious to use a database connection as-is (i.e., without making any changes to the database connection or to the functionality of the database server) to collect performance data.

Figure 3A:
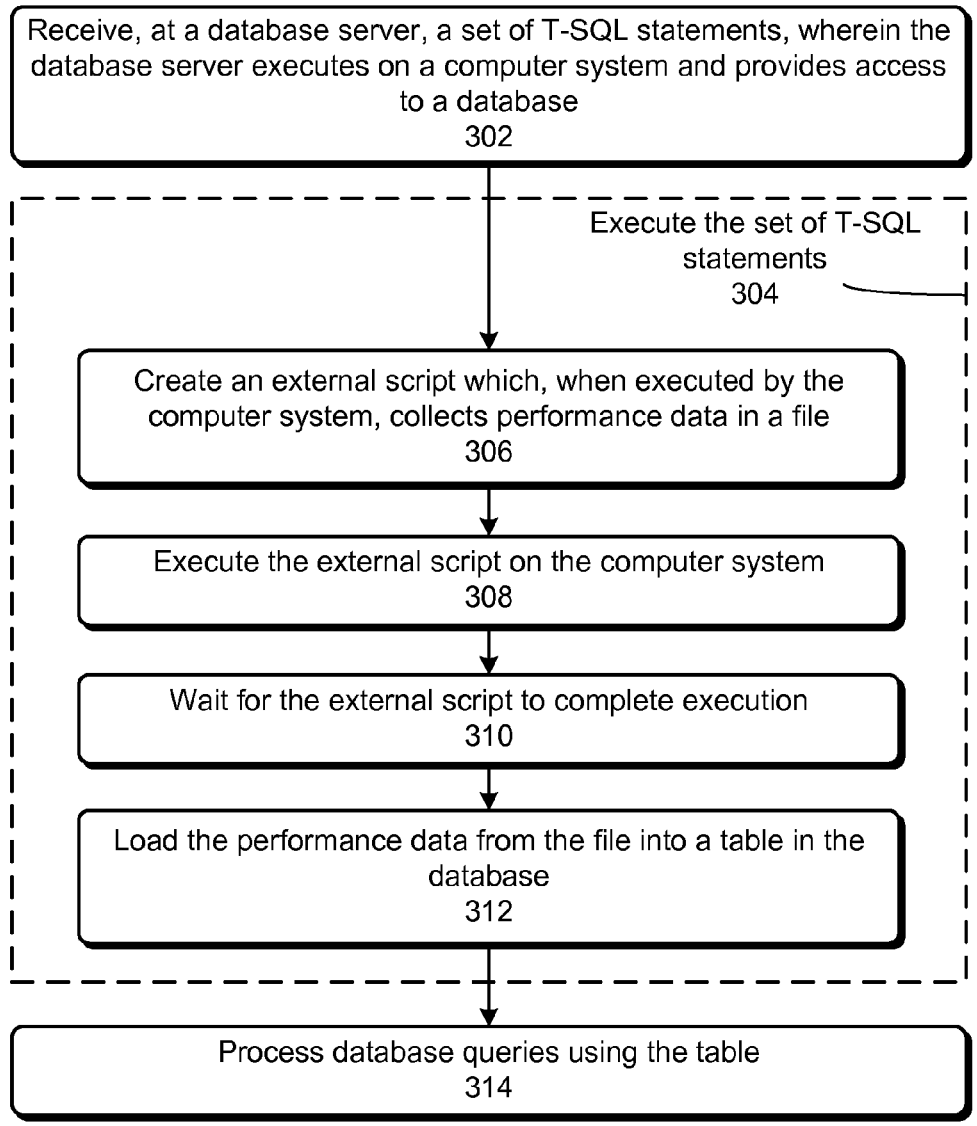
FIG. 3A presents a flowchart that illustrates a process for collecting performance data using a database connection in accordance with some embodiments described herein.

FIG. 3A presents a flowchart that illustrates a process for collecting performance data using a database connection in accordance with some embodiments described herein.

The process can begin with a database server receiving a set of T-SQL (Transact-SQL) statements, wherein the database server executes on a computer system and provides access to a database (operation 302).

Next, the database server can execute the set of T-SQL statements (operation 304). Executing the T-SQL statements can cause the database server to: (1) create an external script which, when executed by the computer system, collects performance data in a file (operation 306); (2) execute the external script on the computer system (operation 308); (3) wait for the external script to complete execution (operation 310); and (4) load the performance data from the file into a table in the database (operation 312). In operation 308, the computer system can execute the external script in a separate process from the database server process (the script is "external" in the sense that it resides and executes outside the database server). Note that the external script created in operation 306 can be created dynamically, i.e., "on-the-fly."

Once the performance data has been loaded into the database table, the database server can process database queries using the table (operation 314). Specifically, the database server can receive a database query to retrieve performance data for a WMI object property. Next, the database server can perform the database query on the table to provide the performance data for the WMI object property.

Figure 3B:
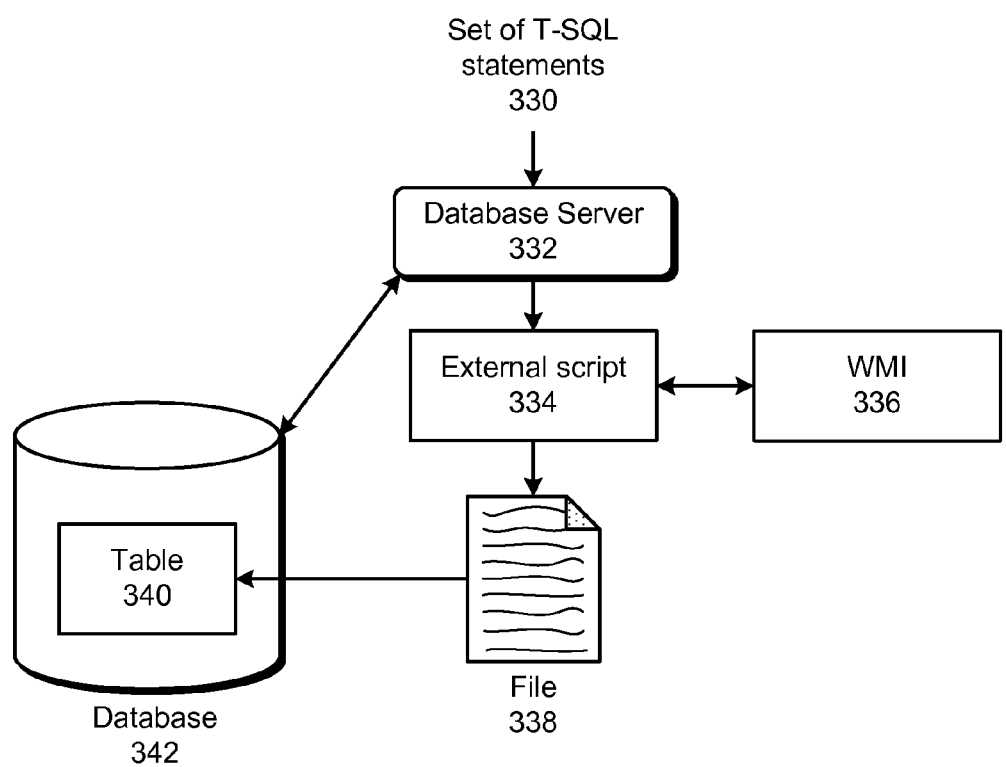
FIG. 3B illustrates how WMI object properties can be enumerated through T-SQL in accordance with some embodiments described herein.

FIG. 3B illustrates how WMI object properties can be enumerated through T-SQL in accordance with some embodiments described herein.

Database server 332 can receive set of T-SQL statements 330. Next, database server 332 can execute set of T-SQL statements 330 to produce external script 334 (e.g., a VBScript). Database server 332 can then request the computer system (e.g., the operating system executing on the computer system) to execute external script 334. External script 334, when executed, can collect performance data by enumerating WMI object properties (e.g., by invoking and/or accessing the appropriate methods and/or objects in WMI 336) and writing the WMI object properties into file 338. For example, external script 334, when executed, can collect performance data for multiple network interfaces by enumerating the network interfaces and accessing performance data fields (e.g., the number of bytes and/or packet sent and/or received) associated with each network interface. Note that external script 334 can execute in a separate process than database server 332. Database server 332 can then load file 338 into table 340 in database 342. Subsequently, database server 332 can service database queries by retrieving performance data for a WMI object property from table 340.

Note that embodiments described herein allow a client device to access performance data through a T-SQL connection. Since the T-SQL connection needs to be set up anyway to perform database operations, embodiments described herein obviate setting up a separate connection for collecting performance data. Furthermore, since the performance data is loaded into a table, the client device can use T-SQL statements to retrieve and manipulate the performance data.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A method for collecting performance data for a database system, the method comprising:
    a database server receiving a set of T-SQL (Transact-SQL) statements, wherein the database server executes on a computer system and provides access to a database; and
    the database server executing the set of T-SQL statements, thereby causing the database server to:
        create an external script which, when executed by the computer system, collects performance data in a file;
        execute the external script on the computer system;
        wait for the external script to complete execution; and
        load the performance data from the file into a table in the database.

2. The method of claim 1, wherein the external script, when executed by the computer system, enumerates WMI (Windows Management Instrumentation) object properties and writes the WMI object properties into the file.

3. The method of claim 2, wherein each row of the table contains performance data for one WMI object property.

4. The method of claim 1, further comprising:
    the database server receiving a database query to retrieve performance data for a WMI object property; and
    the database server performing the database query on the table to provide the performance data for the WMI object property.

5. The method of claim 1, wherein the external script is executed in a process that is separate from the database server.

6. A non-transitory computer-readable storage medium storing a set of T-SQL (Transact-SQL) statements that, when executed by a database server executing on a computer system, cause the database server to perform a method for collecting performance data, the method comprising:
    creating an external script which, when executed by the computer system, collects performance data in a file;
    executing the external script on the computer system;
    waiting for the external script to complete execution; and
    loading the performance data from the file into a table in a database on the database server.

7. The non-transitory computer-readable storage medium of claim 6, wherein the external script, when executed by the computer system, enumerates WMI (Windows Management Instrumentation) object properties and writes the WMI object properties into the file.

8. The non-transitory computer-readable storage medium of claim 7, wherein each row of the table contains performance data for one WMI object property.

9. The non-transitory computer-readable storage medium of claim 6, wherein the external script is executed in a process that is separate from the database server.

10. A database system, comprising:
    a first computer system comprising a memory, a processor, and a set of instructions that, when executed on the processor, cause the processor to implement a client;
    a second computer system comprising a second memory, a second processor, and a second set of instructions that, when executed on the second processor cause the second processor to implement a database server providing access to a database;
    wherein the client is configured to send a set of T-SQL (Transact-SQL) statements to the database server; and
    wherein the database server is configured to execute the set of T-SQL statements, thereby causing the database server to:
        create an external script which, when executed by the second computer system, collects performance data in a file;
        execute the external script on the second computer system;
        wait for the external script to complete execution; and
        load the performance data from the file into a table in the database.

11. The database system of claim 10, wherein the external script, when executed by the second computer system, enumerates WMI (Windows Management Instrumentation) object properties and writes the WMI object properties into the file.

12. The database system of claim 11, wherein each row of the table contains performance data for one WMI object property.

13. The database system of claim 10,
    wherein the database server is configured to receive a database query to retrieve performance data for a WMI object property; and
    wherein the database server is configured to perform the database query on the table to provide the performance data for the WMI object property.

14. The database system of claim 10, wherein the external script is executed in a process that is separate from the database server.

* * * * *